May 10, 1927.

H. M. HOBART

INDUCTION MACHINE

Filed Aug. 24, 1923 2 Sheets-Sheet 1

1,628,464

Inventor:
Henry M. Hobart.
by Alexander F. [illegible]
His Attorney.

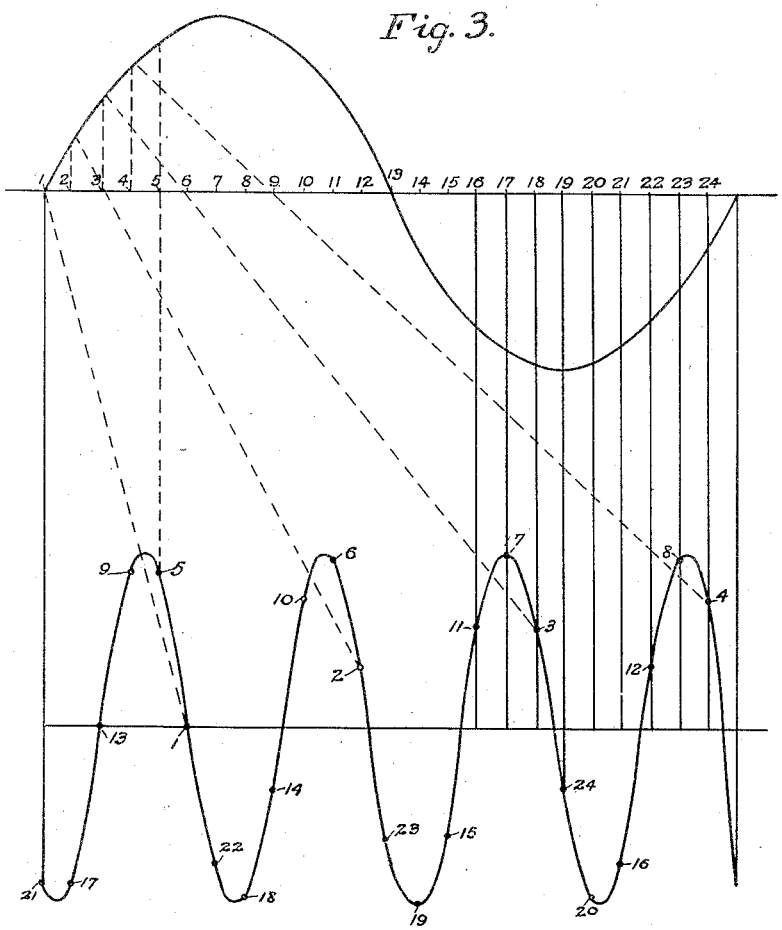

Patented May 10, 1927.

1,628,464

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

INDUCTION MACHINE.

Application filed August 24, 1923. Serial No. 659,231.

My invention relates to induction machines and in particular to a special cascade connection for induction motors. The invention is particularly advantageous for high voltage, low speed installation and has for its principal object the elimination of all slip rings on induction motors connected in cascade.

Figure 1:
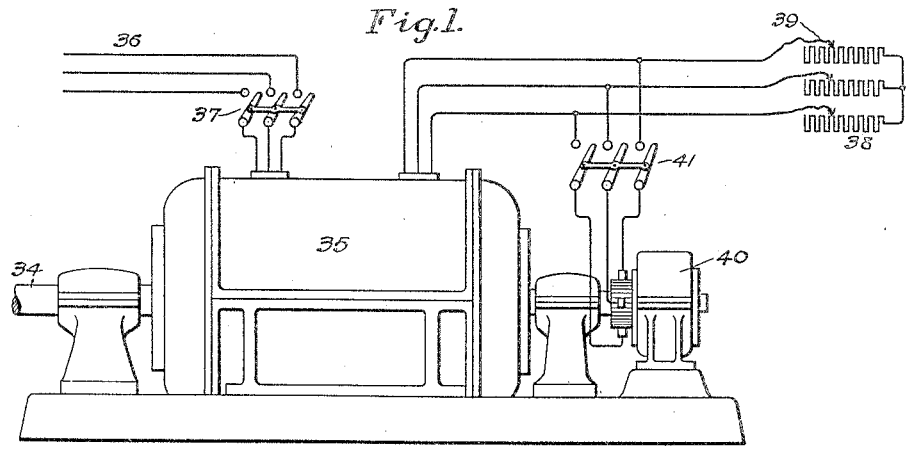
Figure 2:
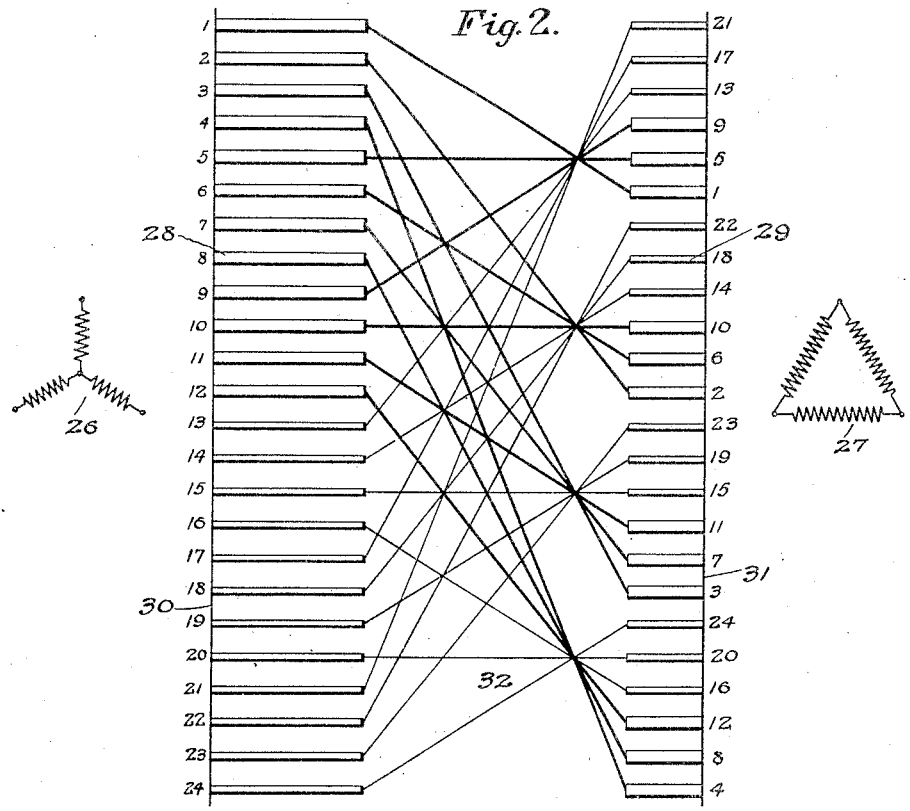

The features of my invention which I believe to be novel and patentable will be pointed out in the claims appended hereto. For a better understanding of my invention reference is made to the following description taken in connection with the accompanying drawings in which Fig. 1 represents the outward appearance of one embodiment of my invention showing a direct connected phase advancer for improving the power factor and increasing the stalling load of a special cascade connected induction machine; Fig. 2 diagrammatically represents the winding arrangement of two induction motors connected in cascade without slip rings, the motors having different pole numbers; and Fig. 3 represents the relative fields produced in the two rotors of Fig. 2 by the connection shown therein.

Referring to the drawings and more particularly to Figs. 1 and 2, 26 represents the primary stator winding of the polyphase induction machine shown at the extreme left in Fig. 1. For the purpose of illustration, and because a very small number of poles would be employed in order to secure in full measure the object in view, this winding will be described as a 2-pole winding; similarly 27 represents the stator winding of the induction machine shown at the right center of Fig. 1 and will be described as an 8-pole winding. Cooperating with winding 26 is a rotor winding 28 and cooperating with winding 27 is a rotor winding 29. These windings may be either of the coil or squirrel cage bar type. For the purpose of explanation and because of the great advantage in securing the objects in view, they will be considered as of the latter type. These two bar windings have short circuited rings 30 and 31, respectively, on their exterior ends only while the inner ends, which face each other, are interconnected by a series of permanent connections represented at 32. The two rotor windings will be wound on the usual type of slotted cores, both mounted on the same shaft and as the simplest case for purposes of illustration both rotors have the same number of slots which, for the purpose of the present description, is taken as 24. The stator windings will be of standard construction and are preferably mounted in a common frame 35. Stator winding 26 is represented as being connected to the high voltage supply line 36 by means of line switch 37. The stator winding 27 is adapted to be connected to the starting resistance 38 by adjustable contact 39, or to the phase advancer 40, by means of switch 41.

The manner of interconnecting the two bar rotors is represented in Fig. 2. The bars of winding 28 are numbered consecutively from 1 to 24 and the bars of winding 29 with which the first mentioned bars are connected are numbered accordingly. By this system of connection a 2-pole rotating flux in the left hand machine will produce, through the currents flowing in the bar windings, an 8-pole rotating flux, rotating in the opposite direction, in the right hand machine. This rotation relation is in accordance with the standard cascade connection; namely, that the direction of rotation of the magnetic flux in the second squirrel cage system shall be opposite to the direction of mechanical rotation of the rotor.

The two fluxes and their relation brought about by this connection is more clearly represented in Fig. 3 where the upper curve represents the bi-polar flux of the 2-pole machine and the lower curve the resultant 8-pole flux of the 8-pole machine. In Fig. 2 the bars lying under a positive pole at any instant are represented as being wider than those lying under a negative pole merely for the purpose of more clearly representing the relation. The bar spacing for the 2-pole curve of Fig. 3 is numbered according to the bar numbering of Fig. 2, and the points on the 8-pole flux curve corresponding to the position of the 8-pole bars are numbered accordingly in the two figures. Points 1, 2, 3, 4 and 5 in the two curves of Fig. 3 are respectively connected by dotted lines to indicate the corresponding connections in Fig. 2.

It will be noted that in the arrangement described, the magnetic flux in the second member of the cascade is nearly stationary in space, revolving only with the low speed corresponding to the slip, which during normal running may be only one percent or less of synchronous speed, since there is no occasion, as in ordinary squirrel cage induction motors, for providing a high resistance rotor as the starting torque is high in virtue of starting with an external resistor. Consequently there is special advantage associated with the use of a floating core within the rotor as described in my copending application, Serial Number 654,264, filed July 27, 1923. The decreased core loss thereby secured improves the efficiency.

In this explanation I have selected a relatively small number of slots and pole numbers for the sake of simplicity. However, it will be evident that various other combinations may be carried out without departing from the sphere of my invention. The decision as to whether the rotor windings should be coil or bar windings will sometimes depend upon the pole and slot numbers selected in any given case. The winding which requires the least complicated interconnection and the least copper in the interconnection should be selected when such considerations are of enough importance to offset the advantage of the features of ruggedness and absence of slot insulation and higher efficiency which characterize the squirrel cage construction.

In the example given, the machine will be started by closing switch 37 with switch 41 open and all the resistance 38 in the circuit of the secondary stator winding 27. The resistance 38 will then be gradually short circuited and when the machine is up to speed, contacts 39 will be opened and switch 41 closed to connect the cascade to the phase advancer 40. The machine described will run at the speed of a 10-pole induction motor, the bi-polar machine comprising windings 26 and 28 acting largely as a transformer.

My invention is believed to be especially beneficial where there is limited space and where a low speed motor is required to run from a high voltage source. A primary transformer will ordinarily not be required, since the first member of the cascade system when designed with very few poles as compared with the second member, constitutes practically a step-down transformer with its high voltage winding on the stator. The absence of slip rings and brushes removes a source of deterioration inevitable with the usual type of high starting torque induction motors and induction motors with phase advancing auxiliaries. The rating of an ordinary slow speed induction motor, as well as an ordinary cascade set, is usually limited by the stalling load. The present construction removes this limitation since it permits of increasing the stalling load by employing a phase advancer without introducing the objectionable feature of slip rings.

In accordance with the provisions of the patent statutes, I have described the principles of operation of my invention together with the apparatus which I now consider to possess the best embodiment thereof, but I desire to have it understood that the apparatus shown is only illustrative and that the invention may be carried out by other means.

What I claim as new and desire to secure by Letters Patent of the United States, is:—

1. An induction cascade comprising a pair of induction machines of different pole numbers having cooperating coil wound stator and bar wound rotor windings, the rotor windings being mounted adjacent each other on the same shaft and interconnected in cascade relation by a system of continuous conductors.

2. An induction cascade comprising a pair of induction machines having different pole numbers and having cooperating stator and rotor windings, the rotor windings being mounted on the same shaft and comprising bars short circuited on one end and having their other ends directly interconnected in cascade relation.

3. A cascade connection comprising a pair of induction machines having stators wound for different pole numbers and cooperating rotors mounted on the same shaft, the rotors comprising slotted cores having the same number of slots, single conductors in each of said slots, said conductors being short circuited on one end of their respective cores, the free end of each conductor being directly connected to a free end of a conductor in the other rotor in such relation as to reverse the phase rotations therebetween and to change the pole number to correspond with the pole numbers of the stator.

4. In an induction motor cascade a bar wound secondary member for a first machine of the cascade and a bar wound primary member for a second machine of the cascade, said members having their windings short circuited on one end only, the other ends being directly interconnected in reversed phase rotation and for different pole numbers.

In witness whereof, I have hereunto set my hand this 23rd day of August, 1923.

HENRY M. HOBART.